(12) United States Patent
Kennedy

(10) Patent No.: US 6,714,141 B2
(45) Date of Patent: Mar. 30, 2004

(54) ELECTRONIC COCKPIT VISION SYSTEM

(76) Inventor: Colm C. Kennedy, 17177 San Jose St., Granada Hills, CA (US) 91344

( * ) Notice: Subject to any disclaimer, the term of this patent is extended or adjusted under 35 U.S.C. 154(b) by 0 days.

(21) Appl. No.: 10/118,516

(22) Filed: Apr. 9, 2002

(65) Prior Publication Data

US 2003/0201911 A1 Oct. 30, 2003

(51) Int. Cl.[7] ............................................... G01C 21/00
(52) U.S. Cl. ...................................... 340/980; 340/973
(58) Field of Search .................................. 340/980, 971, 340/973; 701/14; 345/6, 7, 8, 848; 2/6.2, 6.5; 359/630, 631, 632

(56) References Cited

U.S. PATENT DOCUMENTS

| | | | | |
|---|---|---|---|---|
| 5,003,300 A | * | 3/1991 | Wells | 340/980 |
| 5,113,177 A | | 5/1992 | Cohen | 340/705 |
| 5,251,333 A | * | 10/1993 | Tsook | 2/6.2 |
| 5,296,854 A | | 3/1994 | Hamilton et al. | 340/980 |
| 6,082,673 A | | 7/2000 | Werjefelt | 244/118 |
| 6,101,431 A | * | 8/2000 | Niwa et al. | 340/980 |
| 6,191,899 B1 | | 2/2001 | Fuchs | 359/894 |
| 6,297,749 B1 | | 10/2001 | Smith | 340/980 |
| 6,567,220 B2 | * | 5/2003 | McDonald et al. | 359/630 |

OTHER PUBLICATIONS

U.S. patent application Publication No. 2001/0010225, for "Emergency Flight Safety Device" by L. Keller. Publication date Aug. 2, 2001, comprised of nine pages.

* cited by examiner

Primary Examiner—Van Trieu
(74) Attorney, Agent, or Firm—Park & Sutton LLP; John K. Park

(57) ABSTRACT

An electronic cockpit vision system for a vision system to enable maintenance of control, in continued flight and landing, of an aircraft and its systems when the cockpit has become invaded with dense and continuous smoke. The system includes an electronic signal converter, a scanner, a windshield video camera, cockpit video camera, and smoke over-goggles equipped with two eye level electronic video display devices. The signal converter feeds its output into a video display equipped smoke qualified over-goggle, resulting in the display upon a virtual screen of information essential to emergency flight and landing. The virtual screen displays the information in appropriate depth perception for ease of comprehension.

13 Claims, 12 Drawing Sheets

ELECTRONIC COCKPIT VISION SYSTEM

BACKGROUND OF THE INVENTION

1. Field of the Invention

The present invention relates generally to a vision system. More specifically it relates to an electronic cockpit vision system to enable maintaining control of an aircraft and its systems when the cockpit has become invaded with dense and continuous smoke. The system must provide adequate information and feedback to perform continued flight and landing of the aircraft, while substantially simulating the normal visual operating conditions of the cockpit environment.

2. Description of the Prior Art

Dense and continuous smoke in the cockpit of an aircraft is a very serious condition normally resulting in the death of all aboard. Loss of the aircraft typically occurs within 6 to 12 minutes. Without reference to instruments or horizon a crew cannot maintain control for more than a very short time.

It can be appreciated that different forms of vision systems have been in use for years. Typically, a vision system is comprised of either the Emergency Visual Assurance System (EVAS) (U.S. Pat. No. 6,082,673 by Werjefelt) or SMOKESCOPE (U.S. Pat. No. 6,191,899 by Fuchs). More recent vision systems for smoke filled cockpits have been disclosed in U.S. Pat. No. 6,297,749 by Smith and U.S. patent application No. 20010010225 by Kind Code and Leo Keller.

Vision systems mounted in the helmet of the pilot have been used for low visibility flight conditions, such as night flying. Such a vision system is disclosed in U.S. Pat. No. 5,113,177 by Cohen. U.S. Pat. No. 5,296,854 discloses a pilot helmet with a visor display system that enables a pilot to view a video image of the external world in low visibility flight conditions. The vision systems designed for external low visibility flight conditions are not sufficient for the unique circumstances of vision interference that are presented by a smoke filled cockpit.

SMOKESCOPE (U.S. Pat. No. 6,191,899 by Fuchs) is a hand held tube, with a lens at each end, which is said to be an aid to viewing instruments in smoke. Its real use in landing is questionable in that it would give a narrow field of view. Being a hand held unit the SMOKESCOPE would demand a single-handed landing, negating pilot throttle control.

EVAS (U.S. Pat. No. 6,082,673 by Werjefelt) is a vision system that relies on a transparent tailored bag, which inflates with filtered smoke/air. The transparent bag displaces the smoke between a pilot's eyes, his primary flight instruments and the windshield. The bag contains air that has been substantially filtered to remove the smoke particles. The pilot presses his face and eyes against one end of the transparent bag, while the other end rests on the flight instruments and the windshield.

The main problem with this conventional vision system is that the EVAS is folded and packed in a container. It must be removed, placed on the glare shield and positioned, as it inflates, between the yoke and the instruments where it remains. It expands upwards to present a window to the pilot and another to the windshield. The same action must be then accomplished for the second pilot.

Another problem with this conventional vision system is that at a time in aircraft development when all emphasis is on reducing crew workload thru electronic systems, EVAS gives them more to do and at such a critical time during an emergency flight and landing. Thus, there is a need for a vision system that is easy to implement and operate.

Another problem with this conventional vision system is that when deployed EVAS gives a view of only the basic flight instruments and the flight path. EVAS does not address the need to view and adjust all the other cockpit controls required to keep an aircraft operating and flying. To view anything else it must be distorted and shoved around. The movement of the transparent bag requires a two handed job for a man with both hands already full. Controls on the center glare shield panel (typically auto pilot controls) are not viewable, nor are communications, transponder and radar on the center control console with EVAS in its normally deployed position. Furthermore, overhead panel controls cannot be viewed with EVAS normally deployed nor can floor mounted controls, such as the emergency landing gear release.

U.S. Pat. No. 6,297,749 by Smith is an emergency operating system for piloting an aircraft in a smoke filled cockpit. The system in the '749' patent does disclose a facemask configured to surround a user's eyes and form an airtight seal. The facemask includes a screen viewable by the user for displaying critical flight operating information. A section of the display screen is clear plastic, which allows viewing of the cockpit through the facemask provided that there is only partial vision obscuring of the cockpit due to the smoke infiltration. An embodiment of the system has a hand-operated communication device that enables non-verbal communication with others. The communication device includes pre-recorded messages to be transmitted to an air traffic controller during an emergency situation. Another embodiment includes a respirator that is integral to the mask, which provides oxygen to the user.

The only video displays transmitted to the facemask by the '749' patent system are the minimum aircraft operating system information and external aircraft images from an externally mounted video camera. Minimum aircraft operating system information can include air speed, altitude, compass heading, rolling angle, pitching angle, path angle, landing gear, flaps and fuel. Attitude could also be included, which is the orientation of an aircraft's axes relative to the horizon or some other reference line. The aircraft operating system information is transmitted from instrument display sources on the aircraft control panel to the facemask by a signal path.

Information that is displayed on the control panel is obtainable, but the system lacks the ability to transmit and display information from other parts of the smoke filled cockpit. The section of the facemask display screen that is clear plastic will provide viewing of the other areas of the cockpit, provided that there is minimal smoke infiltration and partial visibility exists within the cockpit. Unfortunately for the pilot, the clear plastic display screen ceases to be effective under severe smoke conditions when internal cockpit visibility is totally obscured. Viewing landing charts, printed information and location of hand controls is severely compromised or totally unavailable during full infiltration of smoke into the cockpit.

Performing the necessary hand movements on the flight controls when the controls and levers cannot be seen is a hazardous task. A good pilot knows by tactile perception the general location of the controls for adjusting the position of the wing flaps. Unfortunately the wing flap controls may be located in close proximity to other controls. Quick multiple movements must be performed to maintain control of the aircraft during an emergency landing situation. Cockpit vision is completely or substantially obscured by the smoke during this chaotic time. Hurried adjustment of the wrong control lever can result in disastrous consequences. A system that provided visual feedback for tactile hand movements would be most advantageous for the survival of the aircraft and pilots.

U.S. patent application No. 20010010225 by Leo Keller et al, discloses a similar facemask vision display system for displaying control panel information, a clear lens for interior viewing and an oxygen apparatus for smoke filled environments. Additionally, the system by Keller provides for Global Positioning System (GPS) data as part of the emergency flight data. The system can include a power supply independent of the normal power supply. As before, this prior art system by Keller does not provide sufficient and effective capability to view landing charts, printed information and the location of hand controls in a cockpit fully immersed in smoke, where the cockpit has essentially no internal visibility.

While these prior art devices may be suitable for the particular purpose to which they address, they are not fully developed as a vision system to enable appropriate maintenance of control, in continued flight and landing, of an aircraft and its systems when the cockpit has become invaded with dense and continuous smoke.

Furthermore, the prior art devices do not provide the visual information and images on a display screen, which will substantially emulate the depth perception that the pilot experiences under normal operating conditions.

Therefore, there is a need for a system to provide a more expansive vision of instrument controls and provide feedback regarding information necessary for the proper emergency operation of an aircraft from a smoke filled cockpit. The system should not rely on normal viewing through the clear lens section of a facemask, since this option is not adequate in dense smoke that substantially obscures cockpit visibility. The system should provide visual feedback on hand controls, printed landing charts and other non-electronic information. The system should provide depth perception relationships between the various presentations of information, which recreates the impression of normal operating conditions.

In these respects, the inventive aspects of the electronic cockpit vision system substantially departs from the conventional concepts and designs of the prior art, and in so doing provides an apparatus primarily developed for the purpose of a vision system providing enhanced depth perception and increased information to enable maintenance of control of an aircraft and its systems during continued emergency flight and landing, when the cockpit has become invaded with dense and continuous smoke.

SUMMARY OF THE INVENTION

An objective of the electronic cockpit vision system is providing a virtual screen that will substantially emulate the depth perception that the pilot experiences under normal operating conditions. This depth perception can significantly enhance the pilot's comfort level and capability to operate the aircraft under chaotic emergency conditions. On a virtual screen the electronic cockpit vision system restores the pilot's view, allowing the pilot to operate the aircraft and continue emergency flight and landing.

An objective of the electronic cockpit vision system is providing adequate viewing of landing charts and other printed information during full infiltration of smoke into the cockpit environment. A handheld scanner is integrated into the system to fulfill this requirement. Substantial benefit is derived, in that emergency landing charts of local airports or topography can be located and read despite the dense smoke. The crew can read approach plates for a landing on an unfamiliar airport.

Further benefit is achieved by scanning and viewing an emergency check-list of procedures to be performed during the chaotic episode of a forced landing. The system enables crewmembers to read their checklists for emergency and normal procedures unobstructed by smoke.

Another objective of the electronic cockpit vision system is allowing visual feedback of the effect of hand controls that steer the aircraft. It is possible, but very difficult to make the necessary hand movements on the controls when the controls can only be felt and their effect not seen. The controls for adjusting the angle of the flaps are often located in close proximity to other controls. Rapid movements must be performed to control the aircraft during an emergency landing situation. Inadvertent adjustment of the wrong lever or control in the dense smoke can result in disastrous consequences.

Crewmembers can locate, read and adjust controls such as fuel management, hydraulics, electrical load shedding, pressurization, flap settings, radio frequencies and landing gear when the cockpit is filled with smoke and thus continue the complex tasks of total aircraft flight management. An advantage of the electronic cockpit vision system is the ability of viewing everything, high or low, within reach of the crew hands via their wrist mounted cameras without significant additional effort.

The benefit of visual feedback for tactile movements of the controls is immense. A windshield camera is provided for the necessary electronic visual feedback. The combined senses of vision and touch allow the pilot to perform the necessary tactile adjustments of steering controls with far greater speed, confidence and reliability than could be accomplished by memory and finger touch alone. The addition of electronic vision within the cockpit environment substantially enhances the chance of survival for the aircraft and occupants.

Furthermore, electronic vision is a great aid in locating the correct emergency landing chart. Printed information is often stored in a compartment, until it is required for emergency use. Many of the airplane controls are located in a fixed position on the instrument panel where they can be somewhat located by memory and hand tactile perception. This fixed position is not sufficient for utilizing the landing charts and other printed information. The pilot does not know beforehand when and where a smoke filled cockpit will occur, or where it may force him to land. The correct landing chart or section of a particular chart must be located within a binder of many landing charts. The procedure is most difficult with just the use of a handheld scanner. The wrist-mounted camera creates electronic visual feedback for locating the correct landing chart, which supplements the subsequent act of scanning the proper chart for transmission of the image onto the virtual screen.

Another objective of the new electronic cockpit vision system is quick and easy implementation of the system under emergency conditions. An advantage of the electronic cockpit vision system is that the pilot can quickly position the various components for rapid operation.

Another objective is to provide a vision system to enable maintenance of control, in continued flight and landing, of an aircraft and its systems when the cockpit has become invaded with dense and continuous smoke. The electronic cockpit vision system allows the pilots to regain adequate vision in a smoke filled cockpit so they may effectively continue flight and execute an emergency landing. The pilots can electronically view the required emergency instruments when they are obscured with smoke or blanketed with soot. The system enables pilots when caught in an otherwise fatal position to get the passengers and themselves on the ground alive.

Another object is to provide an electronic cockpit vision system that electronically enables crewmembers to see the flight and landing path outside the windshield without obstruction of cockpit smoke or soot. For the accomplishment of this objective, a protective gasket surrounding the windshield camera provides a sealed cavity that prevents the ingress of smoke into the windshield camera.

Other objects and advantages of the present invention will become obvious to the reader and it is intended that these objects and advantages are within the scope of the present invention.

A primary object of the present invention is to provide an electronic cockpit vision system that will overcome the shortcomings of the prior art devices. In view of the foregoing disadvantages inherent in the known types of vision systems now present in the prior art and in view of the technical breakthrough represented by the subsequent introduction of the Electronic Standby Instrument System (ESIS), the present invention provides a new electronic cockpit vision system construction or "SeeThruSmoke" (STS), which can be utilized for a vision system to enable maintenance of control, in continued flight and landing, of an aircraft and its systems when the cockpit has become invaded with dense and continuous smoke.

The Electronic Standby Instrument System (ESIS) now being delivered as part of the standard package of cockpit instruments on new transport aircraft, and being available for retrofit on all aircraft, presents to the pilot all the attitude, altitude and navigational information he needs to accomplish an emergency decent and landing all on one independently powered instrument. The STS, electronic cockpit vision system, enables him to view and use this information and see his flight/landing path even when his vision is inhibited by dense and continuous cockpit smoke. The electronic cockpit vision system utilizes the existing information provided by the ESIS. Additionally the electronic cockpit vision system significantly enhances the information provided and the virtual screen provides depth perception to the pilot in viewing the information.

The general purpose of the present invention, which will be described subsequently in greater detail, is to provide a new electronic cockpit vision system that has many of the advantages of the vision systems mentioned heretofore and many novel features that result in a new electronic cockpit vision system, which is not anticipated, rendered obvious, suggested, or even implied by any of the prior art vision systems, either alone or in any combination thereof.

To attain this, the present invention generally comprises an electronic signal converter and memory unit with data base decoder, a scanner, a windshield video camera, one or more cockpit video camera(s), one goggle per required crewmember (normally not more than 3) equipped with two eye level electronic video display imaging modules and their related circuitry and controls, one battery backed-up power supply of the required voltages, one set of cables, wires and plugs to interconnect the above items.

The signal converter processes the signals from the windshield camera, the ESIS (Electronic Standby Instrument System), the cockpit cameras and the scanner. The signals are modified by the signal converter and combined for transmission to the goggle, where the information is presented to the crew as a virtual image upon a virtual screen.

The scanner can be held in one hand, while scanning emergency procedure checklists, landing charts, maps and other printed information. The information is transmitted to the goggle screen. The emergency checklist, pre-loaded in the converter, assists the pilot in calmly and quickly performing the correct procedures in a chaotic situation.

The windshield camera is a video camera with normal day/high night sensitivity. This is mounted on the windshield or on a swing down bracket above it. Windshield cameras are known in the prior art.

The cockpit camera(s) consist of one or more wrist-mountable illuminated mini video camera(s). The cockpit camera can be pointed for viewing of any object within the cockpit by a simple movement of the pilot's wrist. Steering controls, flap adjustments, location of printed information and additional instrumentation panel readings can all be obtained through the skilled movement of the cockpit camera. The ESIS system transmits to the smoke goggle screen the essential flight information, while viewing and control of additional instrumentation can be achieved with the video image provided by the cockpit camera.

The goggles comprise of one set (1 to 3) of electronic video display equipped qualified smoke-goggles or over-goggles. The goggles receive electronic video images from the ESIS, hand-held scanner, cockpit camera and the windshield camera. The video images from each input are displayed on different display areas of the virtual screen.

A power supply of the required voltages is fed from an independent standby battery. The ESIS is equipped with its own standby battery, which is independent of the battery system that powers the cockpit instrumentation during normal operation. Many newer planes built after the year 2000 are equipped with an ESIS. The independent standby battery from the ESIS can be used to power the electronic cockpit vision system or an additional independent standby battery can be supplied with the electronic cockpit vision system.

Following is a brief description on the method of operation of the system. On recognizing a potential smoke emergency the crew locates the windshield camera and turns on the power switch located on the signal converter. Flight Manual procedures are carried out as mandated.

When smoke becomes dense and loss of vision is anticipated the pilot dons the goggles. He then turns on the goggles using the momentary button mounted on the goggles at eye level. The pilot confirms he has vision of the flight path thru the windshield camera in his display with the standby electronic flight instrument center overlaid on it. The co-pilot then dons his goggles, plugs them in and turns them on. The pilot then dons his wrist camera and plugs it into the face of the signal converter. Both pilots can see the wrist camera images in the lower right window on their displays. Both pilots have identical displays.

The crew is now back in control and can resume emergency decent and landing. At any time either crewmember may scroll thru emergency and other information stored in the system, which both pilots will see in a window at the left of their screen. Approach plates or anything else scanned in, or in memory, will appear when scrolled up in this window. The scrolling momentary switch is located on the goggles.

In one version, there are three switches mounted on the goggle. Two over the left eye control the emergency checklist display and its page scrolling function. One over the right eye controls the size of the ESIS presentation and its location on the screen. An on/off button is mounted on both the hand camera and scanner.

There has thus been outlined the more important features of the invention in order that the detailed description thereof may be better understood, and in order that the present contribution to the art may be better appreciated. There are additional features of the invention that will be described hereinafter.

In this respect, before explaining embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
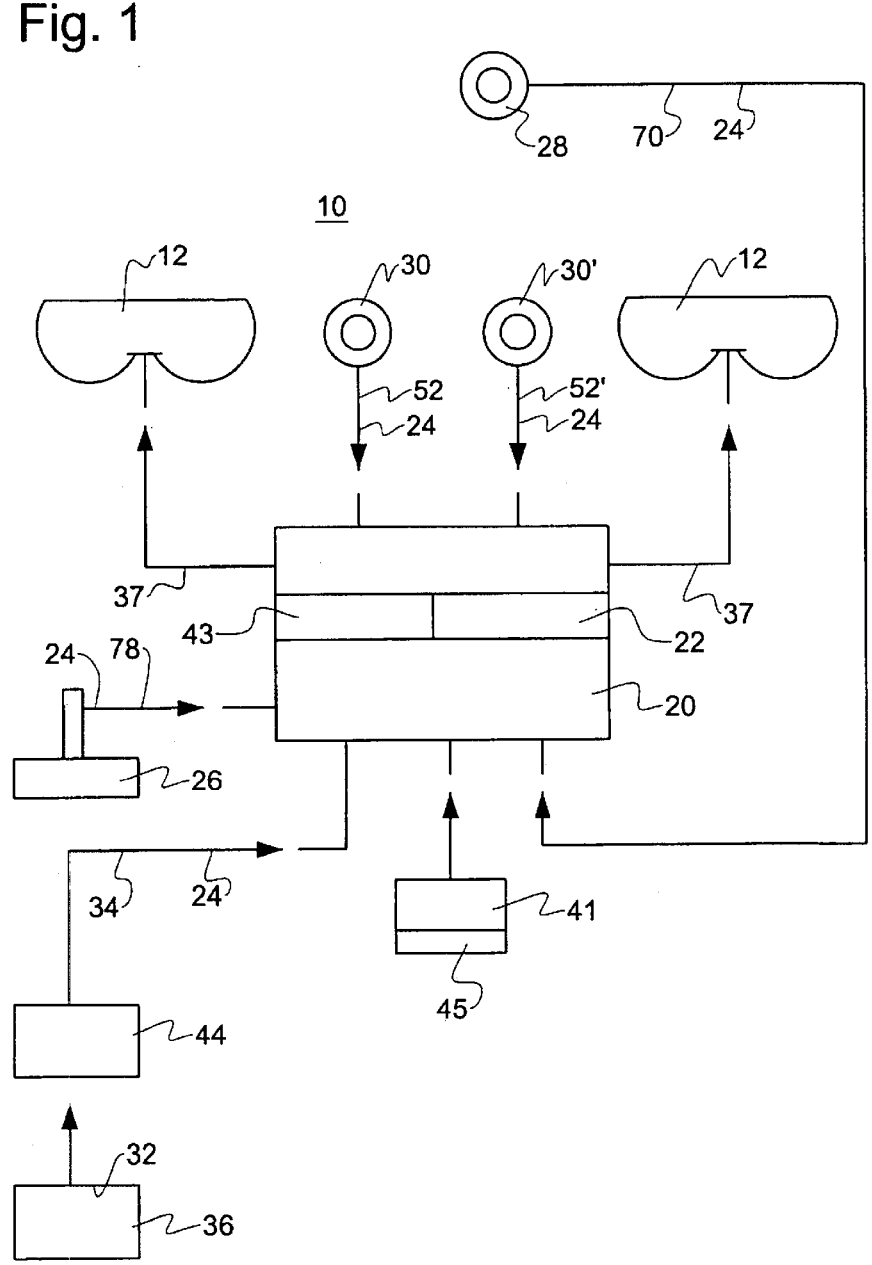
FIG. 1 is schematic layout of the electronic cockpit vision system.
Figure 2:
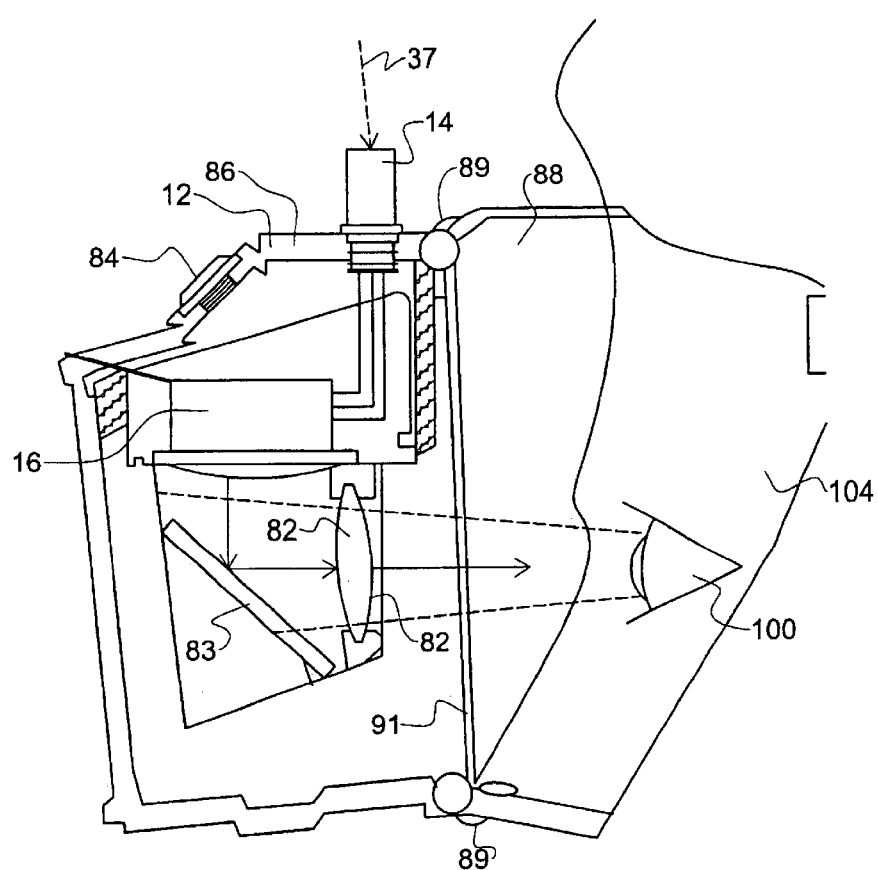
FIG. 2 is a left side view of the goggles as over-goggles, which are attached to an existing smoke-goggle.
Figure 3:
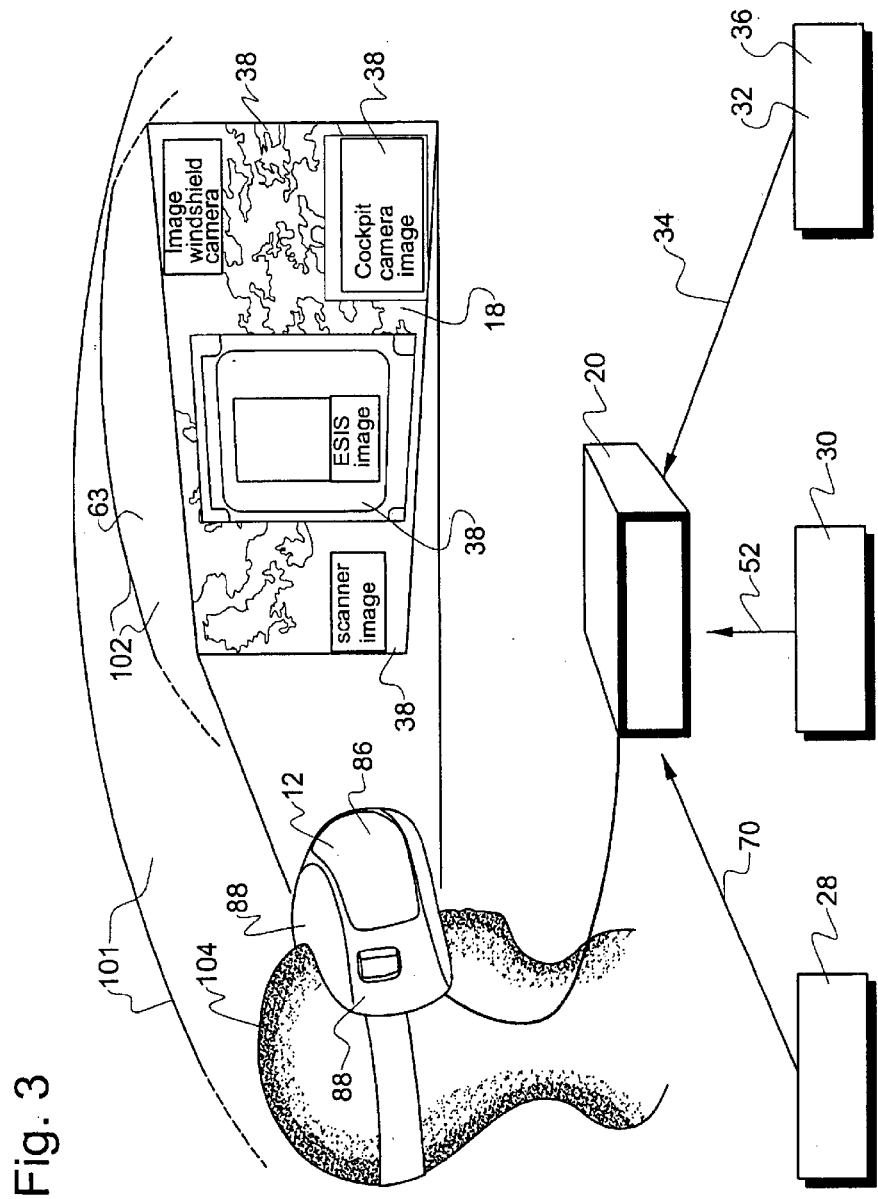
FIG. 3 is perspective view of a graphic depiction of the virtual screen along with goggles, cameras, and scanner.

Referring to FIGS. 1, 2 and 3, an electronic cockpit vision system 10 includes a goggle 12 having an instrument input 14 and an imaging module 16 that projects a virtual screen 18. A signal converter 20 is in communication with the goggle 12. The electronic signal converter 20 has a memory unit 22. One or more instruments transmit signals 24 to the signal converter 20. The signal converter 20 modifies the signals 24 so that the signals 24 are compatible with the goggle 12 and imaging module 16.

A scanner 26 transmits printed information into the signal converter 20. A windshield camera 28 inputs video images 38 of the exterior of the aircraft into the signal converter 20. Two cockpit cameras 30, 30' input video images 38 of the interior of the cockpit 101 into the signal converter 20. The signal converter 20 also communicates with the Electronic Standby Instrument System 32 (ESIS). The arrows indicated the directional flow for the signals 24.

The signal converter 20 receives the signals 24 from the various instruments and modifies the signals 24. FIG. 1 shows the signals 24 entering the signal converter 20 and existing the signal converter 20 as a combined second signal 37. The second signal 37 is communicated to the goggle 12. A first instrument signal 34 transmits data from a first instrument 36 to the signal converter 20. The signal converter 20 modifies the first instrument signal 34 into the second signal 37 such that the second signal 37 is compatible with the goggle 12 and the imaging module 16. The instrument input 14 of the goggle 12 receives the second signal 37 from the signal converter 20. The first instrument signal 34 may be combined with other signals 24 to form the second signal 37. Each signal 24 transmits an image 38 that is projected onto the virtual screen 18. The second signal 37 contains a combination of images 38, with each instrument sending an individual image 38.

The first instrument signal 34 transmits an image 38 from the first instrument 36, which is shown as the ESIS 32, to the signal converter 20. The signal converter 20 receives the first instrument signal 34 and modifies the first instrument signal 34 into a second signal 37. The second signal 37 is in a form that is compatible with the imaging module 16. The signal converter 20 communicates the second signal 37 to the imaging module 16. The imaging module 16 creates an image 38 from the second signal 37 and the image 38 is projected as a virtual screen 18.

The first instrument 36 is depicted as an Electronic Standby Instrument System 32 (ESIS). The first instrument signal 34 is depicted as an ESIS signal 39. Alternately, the first instrument signal 34 can be transmitted from the scanner 26, the windshield camera 28, cockpit camera 30, or other instrumentation input sources. Each of the aforementioned devices has its own signal 24 that is communicated to the signal converter 20 and then communicated to the goggle 12. An image 38 from each of the signals 24 is displayed on the virtual screen 18 of the goggle 12. A power supply 41 of the required voltages is fed from the ESIS standby battery or other independent standby battery 45.

The first instrument signal 34 provides information from the emergency standby instrumentation system 32 (ESIS). The first cockpit camera signals 52, 52' provides information transmitted from the cockpit cameras 30, 30'. The first windshield camera signal 70 provides information transmitted from the windshield camera 28. The first scanner signal 78 provides information transmitted from the scanner 26. Collectively the first instrument signal 34, the first cockpit camera signals 52, 52', the first windshield camera signal 70, and the first scanner signal 78 are referenced as signals 24. These signals 24 (34, 52, 52', 70, 78) are modified by the signal converter 20 and combined to form the second signal 37, which is communicated to the imaging module 16 in the goggle 12. Additional devices can be added to input signals 24 and images 38 into the signal converter 20 for transmission to the imaging module 16 and display on the virtual screen 18.

Referring particularly to FIG. 3, the goggle 12 and imaging module 16 project a screen that displays one or more images 38. The screen is a virtual screen 18 that creates the impression of the image 38 being at some distance beyond the goggle 12. The image 38 does not appear to be within a few inches of the eye 100 where the imaging module 16 is positioned, but rather the image 38 appears to be about where the windshield 102 of the cockpit 101 would be located. The virtual screen 18 creates the impression that the image 38 is greater than about one foot away from the pilot 104. In one embodiment the images 38 appear to be at about the same distance from the pilot as the distance from the pilot to the windshield.

Additionally, the virtual screen 18 allows the pilot to have depth perception, with the images 38 of the ESIS 32 instrumentation and the images 38 from the cockpit camera 30 appearing to be closer to the pilot than the external images 38 from the windshield camera 28. The pilot 104 becomes accustomed to normal operating conditions where the pilot 104 is closely surrounded by the instrumentation and the cockpit 101 environment. Conversely, the external view through the windshield is of an environment that can be substantially further away. It is important that the imaging module 16 via the virtual screen 18 recreate the impression of this depth differentiation between the internal cockpit 101 environment and the external environment.

The image 38 of the printed information from the scanner 26 is projected onto the virtual screen 18. The printed information is of sufficient size to be readable. The printed information can appear to be at a distance away from the eyes 100 that approximates normal reading distances of about one to three feet. The image 38 of the printed information can be enlarged to fill more of the virtual screen 18 or reduced when greater viewing of the information from the other instruments is desired.

This apparent projecting of the images 38 recreates, to some degree, the visual environment that the pilot 104 is comfortable within. Performing emergency procedures in a smoke filled cockpit 101 requires that the pilot 104 remain as calm as possible. The virtual screen 18 projects a visual image 38 that substantially replicates the depth perception that the pilot 104 perceives when looking out of the windshield under normal operating conditions. The images 38 of the ESIS 32 instrumentation and the images 38 from the cockpit camera 30 and scanner 26 appear to be superimposed at a closer distance than the external images 38 from the windshield camera 28. The virtual screen 18 emulates the view with appropriate depth perception that the pilot 104 experiences under normal operating conditions. This sense of depth perception can increase the pilot's confidence and capability to operate the aircraft from a smoke filled cockpit 101, which culminates in a safe and successful landing of the endangered aircraft.

Figure 4:
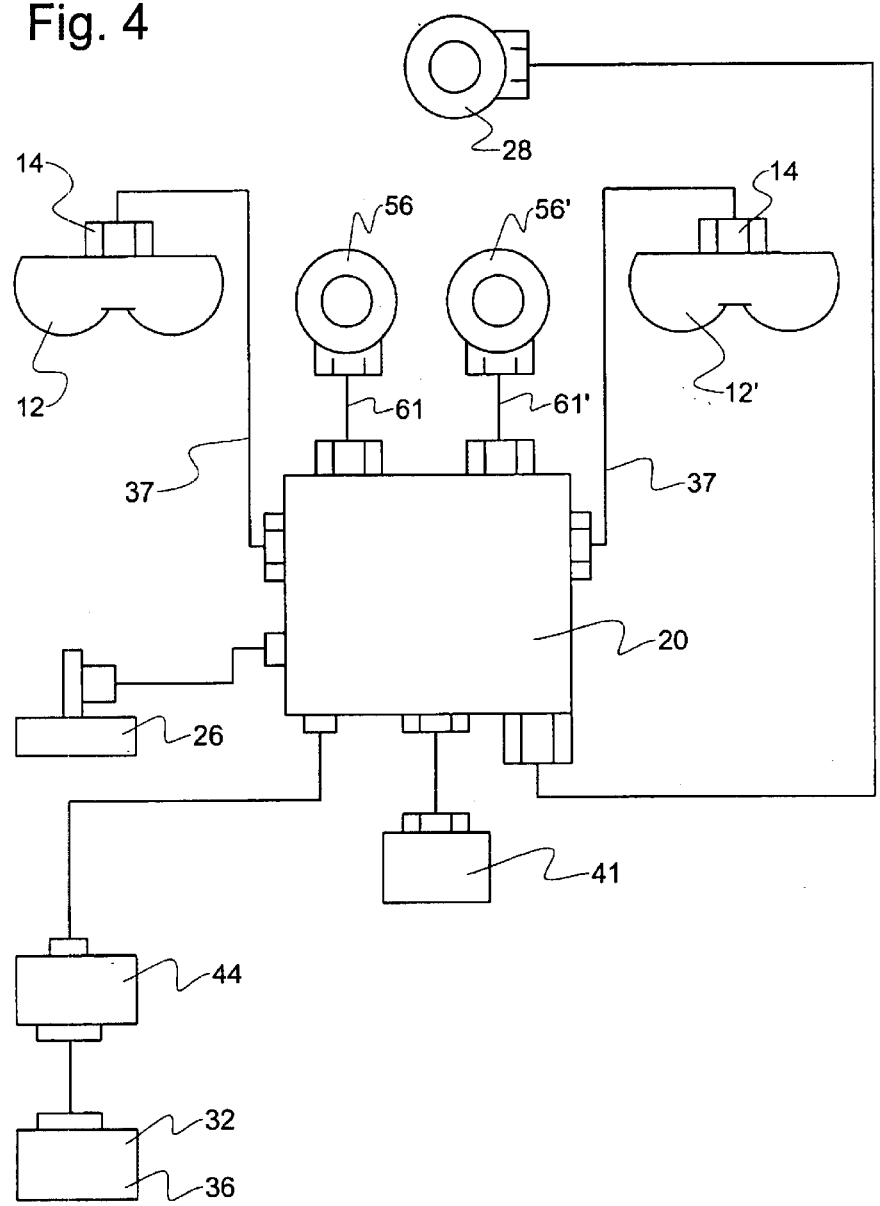
FIG. 4 is a layout of the electronic cockpit vision system including the hand held infra-red flashlight camera.

FIG. 4, is similar to FIG. 1 without the directional arrows that indicated the direction of the signals 24. Also the wrist-mounted cockpit cameras 30, 30' are replaced by handheld infra-red flashlight cameras 56, 56'. The flashlight cameras 56, 56' transmit and communicate first flashlight camera signals 61, 61' to the signal converter 20. The signal converter 20 modifies the first flashlight camera signals 61, 61' into a portion of the second signal 37, which is communicated to the goggle 12. The other instruments are the same as in FIG. 1.

Figure 5:
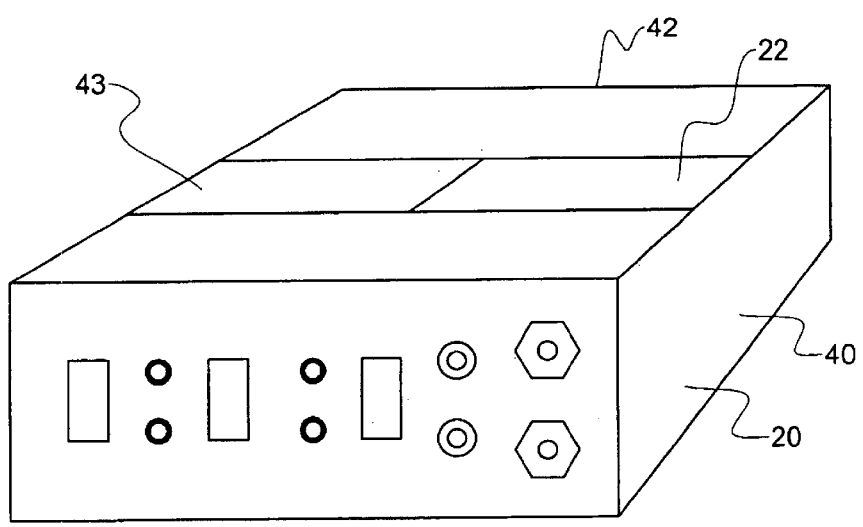
FIG. 5 is a front perspective view of the Signal Converter and Data Base Adapter.

Referring to FIG. 5, the signal converter 20 with memory unit 22 is a metal shrouded specialized computer 40 enclosed in a housing 42. It is specifically designed and built to mount vertically on a standard aircraft 'Dzus rail' or any other convenient structural support. The high-speed computer 40 with adequate memory, operating system and custom software is designed to handle the required electronic inputs to generate the outputs necessary for the required display. An example of a signal converter 20 is a modified Remora 700 Easy AV.

The structural arrangement can be any metal container that meets tie down and containment requirements of the aircraft specification and demonstrates satisfactory RMI suppression. The preferred arrangement is an aircraft standard 'Dzus Rail' mounted aluminum container. The Data Base decoder 43 decodes the Airinc 429 data from the electronic standby instrument system (ESIS) buss 44 (shown in FIG. 1) and/or flight management system (FMS) buss to make it compatible with the electronic cockpit vision system 10 required data. Variations of what an operator can put in the computer memory unit 22 for later display are only limited by the capacity installed and could include charts, approach plates, emergency procedures, COM/VOR frequencies and check lists.

Figure 6A:
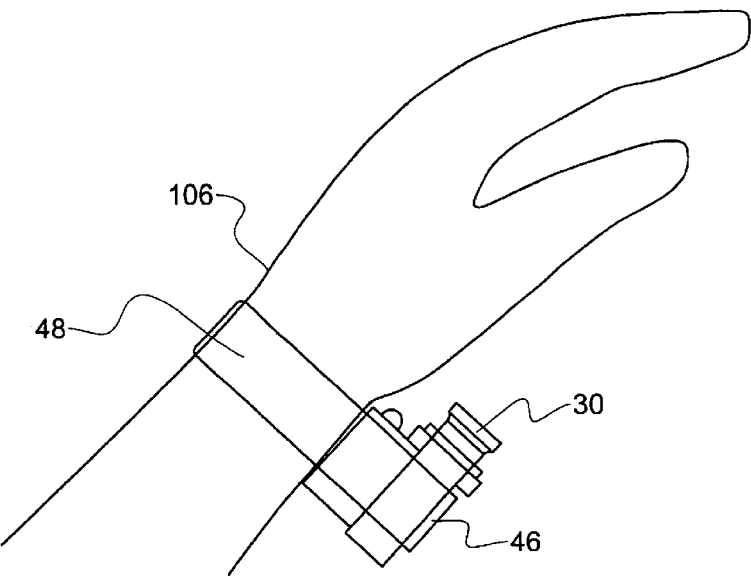
FIG. 6a is a right side view of the cockpit camera.
Figure 6B:
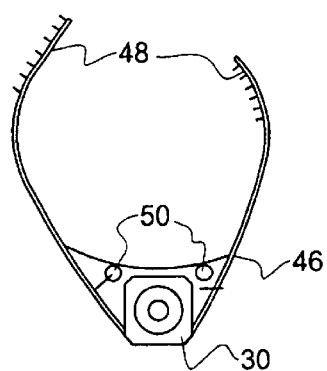
FIG. 6b is a front view of the cockpit camera.
Figure 6C:
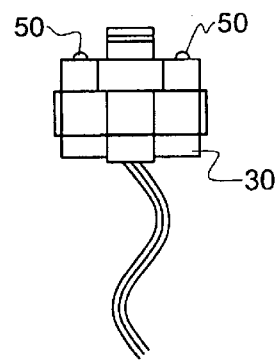
FIG. 6c is a top view of the cockpit camera.

Referring to FIGS. 6a, 6b and 6c, the cockpit camera 30 is a micro video camera with a short focal length enabling it to focus on whatever the crewmember's fingers are touching when it is attached to the underside of a crewmember's wrist 106. The support of the cockpit camera 30 is a connector 46 of molded plastic, which may be held on the wrist by a Velcro strap 48. The primary function is to look at any control, display or keyboard the crewmember wishes to see. By virtue of its proximity and lights 50 25 providing illumination the cockpit camera 30 can record a view of the desired item through smoke. The image 38 of the item is then electronically transmitted to a display area on the virtual screen 18 of the goggle 12. As shown in FIG. 1, the cockpit camera 30 transmits and communicates a first cockpit camera signal 52 to the signal converter 20. The signal converter 20 modifies the first cockpit camera signal 52 into a portion of the second signal 37, which is communicated to the goggle 12.

Figure 7:
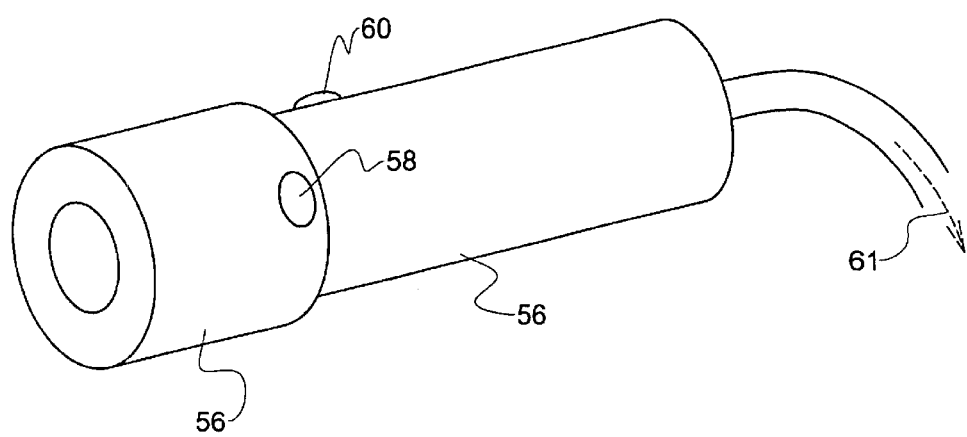
FIG. 7 is a side perspective view of the hand held infra-red flashlight camera.

Referring to FIGS. 4 and 7, in an alternate embodiment, the wrist-mounted cockpit camera 30 is replaced by a handheld infra-red flashlight camera 56. The infra-red flashlight camera 56 also has a short focal length enabling it to focus on whatever is near the crewmember's hand. The infra-red light is capable of illuminating an object through the dense smoke so that the camera portion can perceive and transmit an image 38 to the signal converter 20. The infrared flashlight camera 56 has two switches. A click switch 58 controls the presentation of the image 38 on the virtual screen 18. The other is a two position slide switch 60 that activates the camera with infra-red capability. As shown in FIG. 4, the flashlight camera 56 transmits and communicates a first flashlight camera signal 61 to the signal converter 20. The signal converter 20 modifies the first flashlight camera signal 61 into a portion of the second signal 37, which is communicated to the goggle 12.

Referring to FIGS. 8a, 8b, 8c, 8d and 8e, the windshield camera 28 is a video camera that has a very high night and standard day sensitivity and is attached so as to give a forward view parallel to the aircraft centerline. The windshield camera 28 is mounted on the interior of the aircraft near the inner surface 103 of the windshield 102. The windshield camera 28 is mounted in substantially close proximity to the inner surface 103, with a protective gasket 64 encircling the lens 66 of the camera. The protective gasket 64 creates a substantially sealed cavity 68 between the windshield camera 28 and the inner surface 103 of the windshield 102. The gasket 64 prevents the ingress of smoke into the cavity 68, thereby providing a substantially clear and unobstructed view of the external environment and flight path. The positioning of the windshield camera 28 inside the cockpit 101 avoids all the operational and maintenance problems associated with the outside flight environment.

Figure 8A:
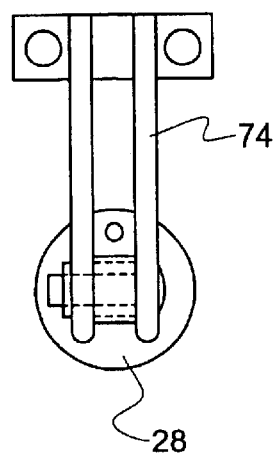
FIG. 8a is a back view of the windshield camera.
Figure 8B:
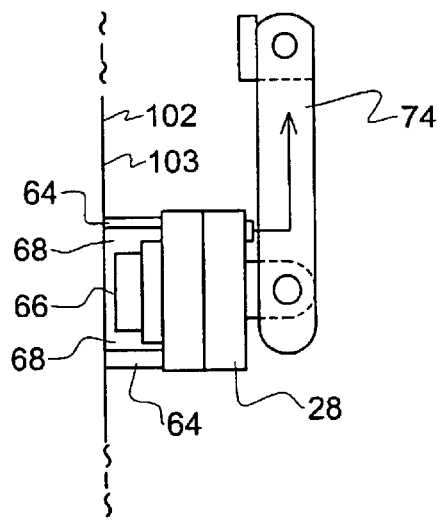
FIG. 8b is a left side view of the windshield camera.
Figure 8C:
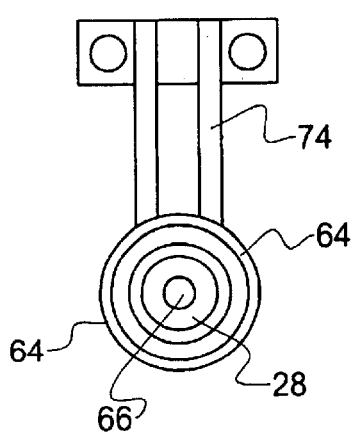
FIG. 8c is a front view of the windshield camera.
Figure 8D:
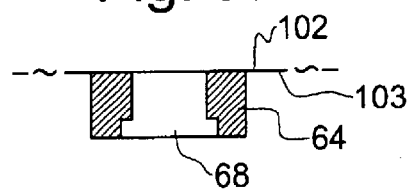
FIG. 8d is a cutaway top view of the gasket.
Figure 8E:
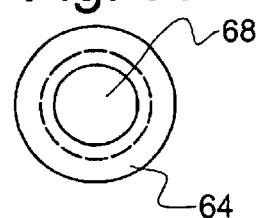
FIG. 8e is a front view of the gasket.

FIG. 8a is a back view of the windshield camera 28 and swing down bracket 74. FIG. 8b is a cutaway side view, with the gasket 64 shown cutaway to expose the lens portion of the windshield camera 28 and the sealed cavity 68. FIG. 8c is a front view with the gasket 64 encircling the lens 66. FIG. 8d shows a cutaway top view of just a gasket 64. The gasket 64 is larger than that shown in FIG. 8c. FIG. 8e is a front view of just the gasket 64.

The windshield camera 28 transmits a first windshield camera signal 70 to the signal converter 20. The first windshield camera signal 70 conveys video images 38 external to the aircraft. The signal converter 20 modifies the first windshield camera signal 70 into a portion of the second signal 37 and communicates the second signal 37 to the goggle 12. The windshield camera 28 may be metal or hi-impact plastic enclosed and either a micro-camera permanently attached to the windshield or a camera mounted on a swing down bracket 74. The windshield camera 28 faces forward to view the flight and landing path.

Figure 9A:
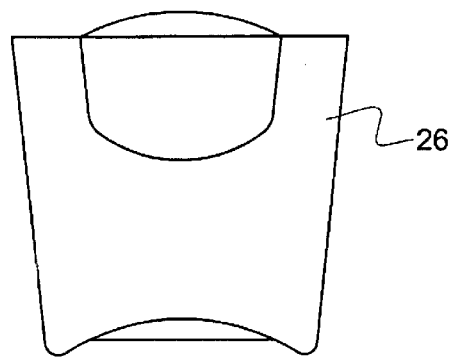
FIG. 9a is a top view of the scanner.
Figure 9B:
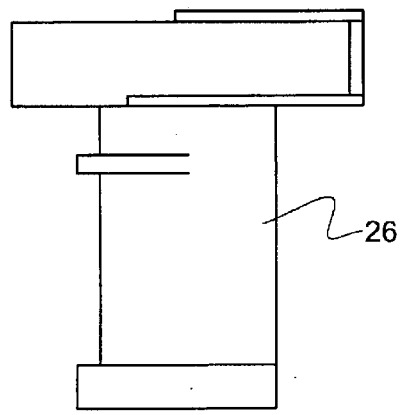
FIG. 9b is a side view of the scanner.
Figure 9C:
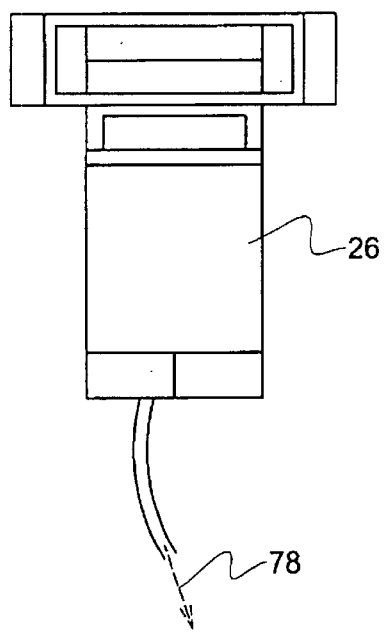
FIG. 9c is a front view of the scanner.

Referring to FIGS. 9a, 9b and 9c, a scanner 26 is mounted within pilot 104 reach. The scanner 26 is a generic PC standard mini or a handheld scanner 26 capable of making input to the computer operating program. The scanner 26 may be a desktop or handheld type connected so that printed information can feed to the computer 40 of the signal converter 20 and thence to the goggle 12. Such information would be en-route airways charts, Jeppeson approach and landing pages. The scanner 26 is connected to the signal converter 20 at all times and is controlled by an integrally mounted switch. The scanner 26 transmits and communicates a first scanner signal 78 to the signal converter 20. The signal converter 20 modifies the first scanner signal 78 into a portion of the second signal 37 and communicates the second signal 37 to the goggle 12.

Referring to FIG. 2, the goggles 12, 12' are each designed to contain two electronic imaging modules 16 with related control circuitry, lens 82, mirror 83 and manual switching. An on-off switch 84 mounted on the goggle 12 is readily accessible for quick activation of the goggle 12. The goggles 12, 12' have the dual purpose of protecting the electronic imaging modules 16 from smoke and presenting selected electronic information in viewable form in front of the pilot 104. This is presented on the large virtual screen 18, which appears to the viewer to be at approximately windshield distance for the instrumentation images 38. The external view image 38 provided by the windshield camera 28 appears to be at a further distance than the instrumentation images 38. FIG. 2 illustrates just one of the two imaging modules 16. A variation would have just one imaging module 16 that is viewable by both eyes 100.

The second signal 37 enters the goggle 12 through the instrument input 14 and travels to the imaging module 16. The imaging module 16 converts the second signal 37 into the various images 38 that have been transmitted by the instruments. The images 38 are conveyed to a mirror 83 and the images 38 are then reflected through the lens 82 onto the eye. The image 38 shows upon a virtual screen 18, which is seen by the eye has having depth differentiation between the various images 38.

The goggle 12 has four primary embodiments. In FIG. 2, a first embodiment has the goggle 12 as a smoke over-goggle 86, which is fabricated to meet the basic requirements called out for smoke-goggles 88 (SAE, AS8031) as applicable. They are made of a flame resistant molded plastic material to conform to the shape of the regulatory agency approved existing smoke-goggles 88 and are worn as over-goggles 86. The smoke over-goggle 86 with video imaging capability is mounted on the standard existing smoke-goggle 88 that is presently used on aircraft.

The over-goggle 86 (12) fits snuggly over the smoke-goggle 88. The attachment is quick and easy, which is essential in an emergency situation. An attachment device 89 can be used to secure the over-goggle 86 to the smoke-goggle 88. The attachment device 89 can be a clip or other mechanism of attachment. The attachment and detachment of the over-goggle 86 from the FAA required smoke-goggle 88 is so simple that should smoke clearance in the cockpit 101 be noticed, then the over-goggle 86 can be raised or removed and normal visual flight resumed. A seal 91 attached to the over-goggle 86, prevents the ingress of smoke between the over-goggle 86 and the smoke-goggle 88.

The over-goggle 86 (12) has the advantage of attaching to an existing Federal Aviation Administration (FAA) approved smoke-goggle 88. Similarly, the signal converter 20 communicates with existing approved flight management systems. This saves on FAA approval costs of flight testing new equipment and securing certifications, which would be required if the existing approved flight management systems or smoke-goggle 88 were penetrated and altered by the addition of the electronic cockpit vision system 10. Due to the simplicity of design, retrofitting of existing aircraft is accomplished in a very short time with minimal disruption of existing systems. Structural variations of the smoke over-goggle 86 and imaging module 16 will be dictated by the TSO C-99 oxygen masks being used on the aircraft.

Figure 10:
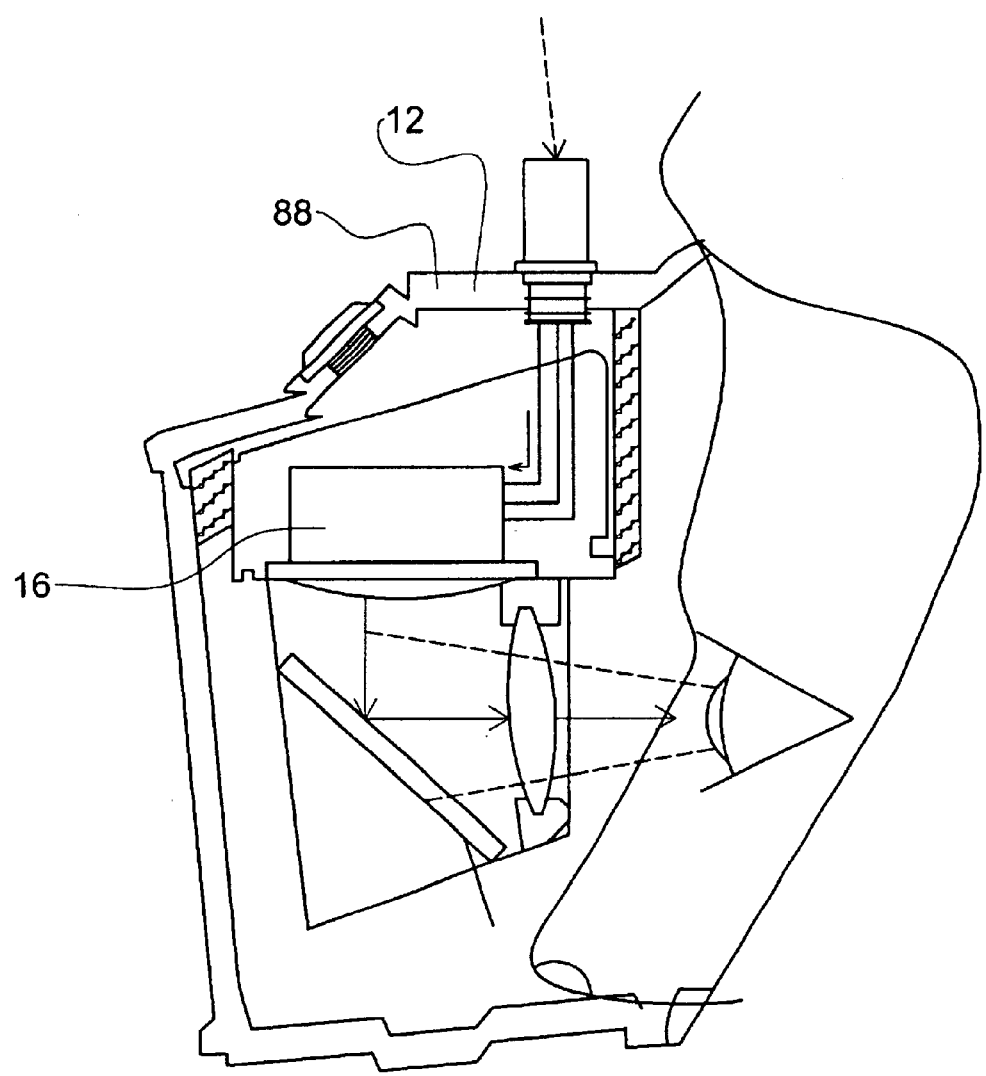
FIG. 10 is a left side view of the goggles integrated into a smoke-goggle.

Referring to FIG. 10, in an alternate second embodiment the electronic cockpit vision system 10 can be integrated within the existing approved smoke-goggle 88 (12), rather than being worn as a separate smoke over-goggle 86. In this second embodiment the goggle 12 is a smoke-goggle 88. The smoke-goggle 88 is not worn during normal flight conditions, but is put on during emergency conditions of smoke ingress into the cockpit 101.

Figure 11:
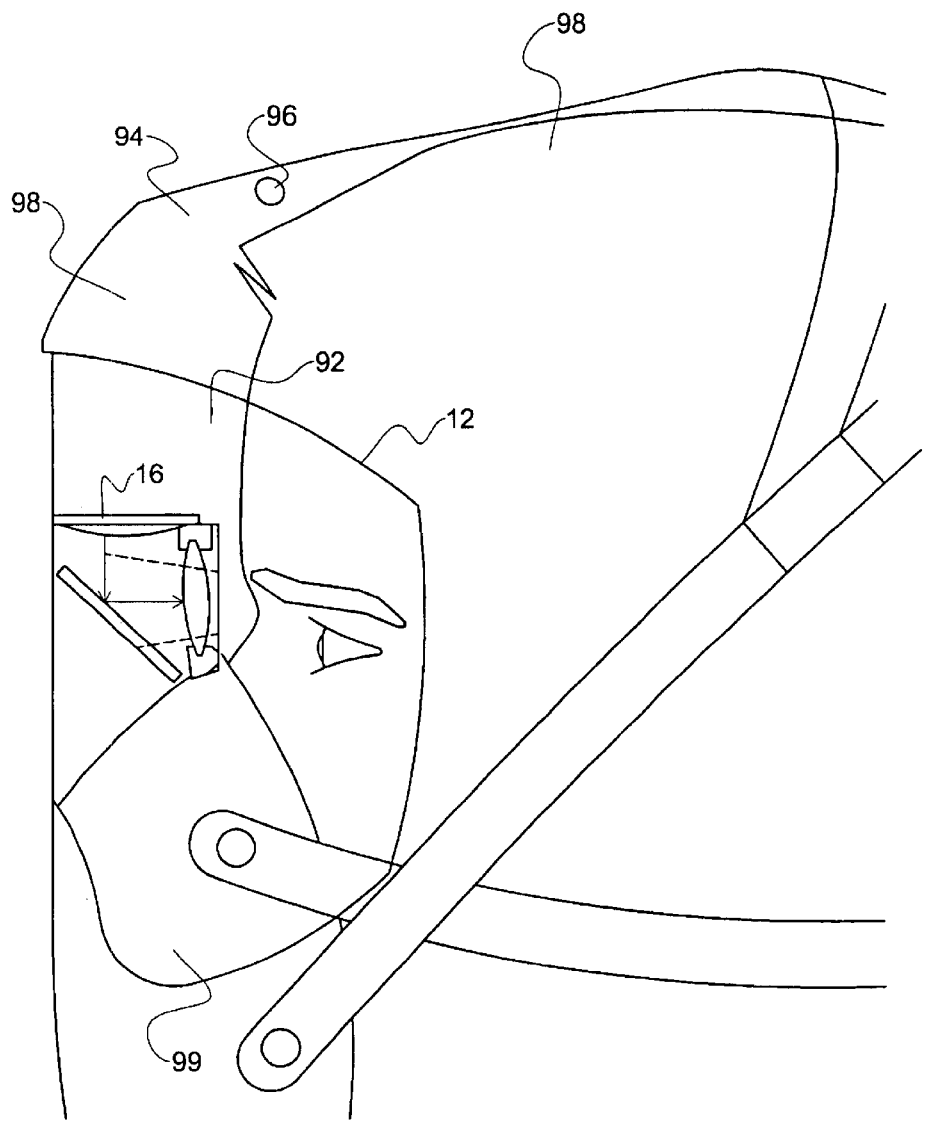
FIG. 11 is a left side of an oxygen facemask with the imaging on the interior of the facemask.

Referring to FIG. 11, in a third embodiment the goggle 12 and imaging module 16 are integrated into the interior 92 of a facemask 94. The imaging module 16 is of reduced size to fit into the interior 92 of the facemask 94. This third embodiment is a logical expansion of the second embodiment. There are numerous variations of the apparatus that are worn on the pilot's face. The facemask 94 is the optimum apparatus that is worn by a pilot 104 and normally includes an oxygen supply for breathing. The imaging module 16 is attached to the facemask 94 by an attachment device 89. A control button 96 is mounted on the exterior 98 of the facemask 94 to activate the imaging module 16 that is mounted into the interior 92.

Typically, the facemask 94 is used by pilots of military fighter aircraft. The imaging module 16 and viewing lens 66 are moved into the pilot's 104 line of sight when required for assistance in a smoke filled environment. Fighter pilots 104 are particularly exposed to combat conditions where damage to the aircraft by the enemy will lead to a smoke obscured cockpit 101. Facemasks 94 with oxygen apparatus 99 that allow modification and inclusion of the electronic imaging module 16 can be so modified and re-certified to serve the same purpose as the over-goggle 86.

Figure 12:
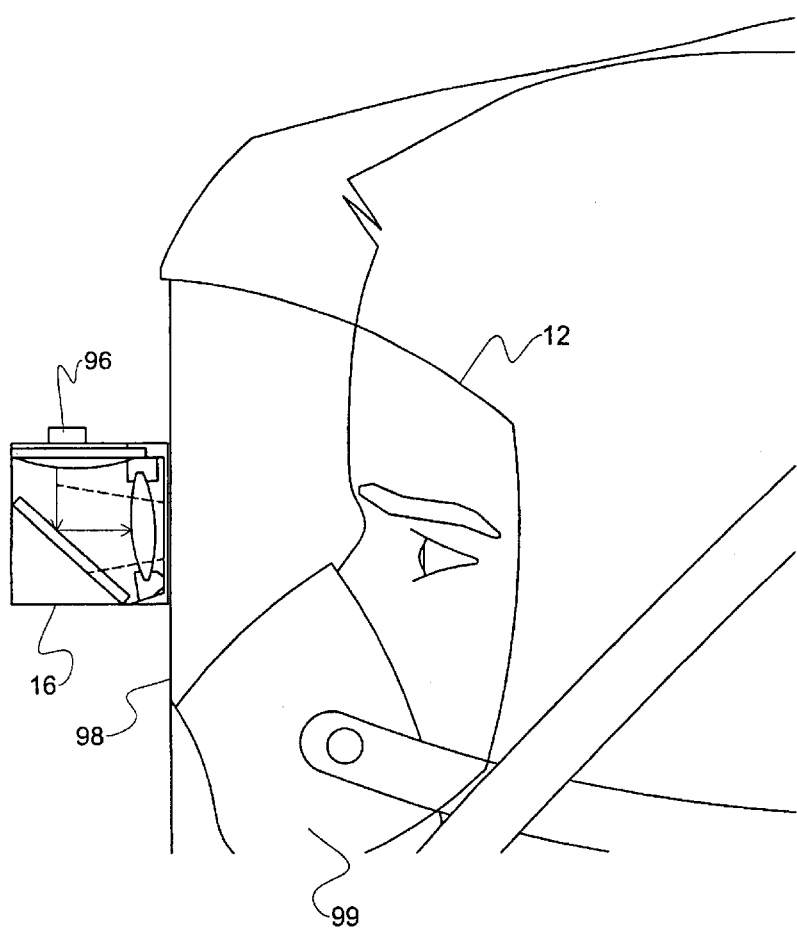
FIG. 12 is a left side view of an oxygen facemask with the imaging module on the exterior of the facemask.

Referring to FIG. 12, in a fourth embodiment the imaging module 16 is attachable to the exterior 98 of the facemask 94 by a magnetic attachment mechanism 90. The control button 96 is mounted directly on the imaging module 16.

Additional goggles 12 can be added per required pilot 104, each equipped with two eye-level electronic imaging modules 16 and their related circuitry and controls. Normally, not more than three goggles 12 are connected to the signal converter 20.

As shown in FIG. 1, a power supply 41 of the required voltages is fed from the ESIS backup battery or other independent standby battery 45. The main battery for the aircraft is not relied upon, since the main battery will often be rendered inoperative by the fire and smoke conditions. The power supply 41 consists of the necessary electrical components to produce the three different voltages required to operate the electronic cockpit vision system 10 from the 24–28 VDC normally available from the aircraft instrument standby battery supply. The power supply 41 is a heat sink mounted transistorized circuit giving an output of 18 VDC, 12 VDC and 6 VDC or as required by the various components. The power supply 41 can be separate or integrated with the converter. The standby battery 45 can be part of the ESIS 32, which is included on most aircraft being presently produced. Alternately, the electronic cockpit vision system 10 can have a dedicated standby battery 45, which is separate from the backup battery within the ESIS 32.

Flexible and hard wires are used to interconnect the components. The wires and cables are those required to transfer the images 38 of digital and video data between the components. The wires and cables can include standard, co-axial and twisted pairs. Hard wires, where used, are installed to meet with the requirements of the aircraft type certificate.

All components are electrically connected with hard-wired or flexible cables. The goggle 12, the wrist mounted cockpit camera 30, and the scanner 26 are each connected by individual flexible cables to the signal converter 20. The signal converter 20 is connected by hardwire to the ESIS 32 through the 429 data ESIS buss 44 and by hardwire to the windshield camera 28. The power supply 41 is connected by hardwire to the signal converter 20. An alternative embodiment is to make all interconnections "wireless" i.e:-low Ghz transmissions (except for the power supply 41). Airplane cockpit 101 environments are noisy electrically. Thus, the wireless transmissions must be capable of screening out the electrical noise that might otherwise interfere with the transmission of data to the signal processor.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed is:

1. An electronic cockpit vision system for controlling the flight of an aircraft by a pilot in a vision obscured cockpit comprising:

a) an over-goggle attachable to a smoke-goggle, wherein the over-goggle has an imaging module and an instrument input, wherein the instrument input receives a first instrument signal from a first instrument, wherein the first instrument signal transmits an image to the imaging module, wherein the imaging module projects the image as a virtual screen, wherein the virtual screen creates the impression of the image being further than about one foot away from the pilot, and wherein the virtual screen allows the pilot to have depth perception;

b) a signal converter in communication with the imaging module, wherein the first instrument signal transmits data from the first instrument to the signal converter, wherein the signal converter modifies the first instrument signal into second signal such that the second signal is compatible with the imaging module, and wherein the signal converter transmits the second signal to the imaging module; and c) a cockpit camera attachable to the pilot, wherein the cockpit camera transmits a first cockpit camera signal to the signal converter, wherein the cockpit camera is wrist-mountable to the pilot, and wherein the first cockpit camera signal transmits video images of objects in substantially close proximity to the wrist-mounted cockpit camera.

2. The electronic cockpit vision system of claim 1, further comprising a windshield camera mounted on the interior of the aircraft and a protective gasket, wherein the aircraft having a windshield with an inner surface, wherein the windshield camera is mounted in substantially close proximity to the inner surface, wherein the protective gasket creates a substantially sealed cavity between the windshield camera and the windshield, wherein the windshield camera transmits a first windshield camera signal to the signal converter, and wherein the first windshield camera signal transmits video images external to the aircraft.

3. The electronic cockpit vision system of claim 2, further comprising a scanner for copying printed information, wherein the scanner transmits a first scanner signal to the signal converter, wherein the first scanner signal transmits the printed intonation to the signal converter, and wherein the printed information is displayed on the virtual screen.

4. The electronic cockpit vision system of claim 3, wherein the first instrument is an electronic standby instrument system.

5. The electronic cockpit vision system of claim 4, wherein to over-goggle having a clip attachment device, wherein the over-goggle is attached to the smoke-goggle by the clip attachment device.

6. An electronic cockpit vision system for controlling the flight of an aircraft by a pilot in a vision obscured cockpit comprising:

a) a goggle having an imaging module and an instrument input, wherein the instrument input receives a first instrument signal from a first instrument, wherein the first instrument signal transmits an image to the imaging module, wherein the imaging module projects the image as a virtual screen, wherein the virtual screen creates the impression of the image being further than about one foot away from the pilot, end wherein the virtual screen allows the pilot to have depth perception;

b) a signal converter in communication with the imaging module, wherein the first instrument signal transmits data from the first instrument to the signal converter, wherein the signal converter modifies the first instrument signal into a second signal such that the second signal is compatible with the imaging module, and wherein the signal converter transmits the second signal to the imaging module; and c) a hand held infra-red flashlight camera, wherein the infra-red flashlight camera transmits video images internal to the aircraft, wherein the infra-red flashlight camera transmits a first flashlight camera signal to the signal converter, wherein the signal converter modifies the first flashlight camera signal into a form compatible with the imaging module, wherein the signal converter combines the first instrument signal with the first flashlight camera signal to produce the second signal, and wherein the first flashlight camera signal transmits video images of objects in substantially close proximity to the infra-red flashlight camera; whereby the imaging module and virtual screen provide to the pilot attitude, altitude and navigational information for an emergency descent and landing.

7. The electronic cockpit vision system of claim 6 wherein the goggle is a smoke-goggle.

8. The electronic cockpit vision system of claim 6, wherein the goggle is an over-goggle, wherein the over-goggle is attachable to a smoke-goggle.

9. The electronic cockpit vision system of claim 8, wherein the first instrument signal is by wireless transmission and wherein the second signal is by wireless transmission.

10. An electronic cockpit vision system for controlling the flight of an aircraft by a pilot in a vision obscured cockpit comprising:

a) a facemask having an interior, an exterior, an imaging module attachable to the interior of the facemask, and an instrument input, wherein the instrument input receives a first instrument signal from a first instrument wherein the first instrument signal transmits an image to the imaging module, wherein the imaging module projects the image as a virtual screen, wherein the virtual screen creates the impression of the image being further than about one foot away from the pilot and wherein the virtual screen allows the pilot to have depth perception;

b) a signal converter in communication with the imaging module, wherein the first instrument signal transmits data from the first instrument to the signal converter, wherein the signal converter modifies the first instrument signal into a second signal such that the second signal is compatible with the imaging module, and wherein the signal converter transmits the second signal to the imaging module; whereby the virtual screen provides to the pilot attitude, altitude and navigational information for an emergency descent and landing; and c) a cockpit camera attachable to the pilot, wherein the cockpit camera transmits a first cockpit camera signal to the signal converter, wherein the cockpit camera is wrist-mountable to the pilot, and wherein the first cockpit camera signal transmits video images of objects in substantially close proximity to the wrist mounted cockpit camera.

11. The electronic cockpit vision system of claim 10, further comprising a windshield camera mounted on the interior of the aircraft and a protective gasket, wherein the aircraft having a windshield with an inner surface, wherein the windshield camera is mounted in substantially close proximity to the inner surface, wherein the protective gasket creates a substantially sealed cavity between the windshield camera and the windshield, wherein the windshield camera transmits a first windshield camera signal to the signal converter, and wherein the first windshield camera signal transmits video images external to the aircraft.

12. The electronic cockpit vision system of claim 11, further comprising a seamier for copying printed information, wherein the scanner transmits a first scanner signal to the signal converter, wherein the first scanner signal transmits the printed information to the signal converter, and wherein the printed information is displayed on the virtual screen.

13. The electronic cockpit vision system of claim 12, wherein the first instrument signal is by wirciess transmission and wherein the second signal is by wireless transmission.

* * * * *